United States Patent
Ko et al.

(10) Patent No.: US 9,334,928 B2
(45) Date of Patent: May 10, 2016

(54) PLANETARY GEAR APPARATUS

(71) Applicant: MANDO CORPORATION, Pyeongtaek-si, Gyeonggi-do (KR)

(72) Inventors: Kyung Min Ko, Seongnam-si (KR); Jung Sik Park, Seongnam-si (KR); Kwang Seok Hong, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 209 days.

(21) Appl. No.: 14/308,850

(22) Filed: Jun. 19, 2014

(65) Prior Publication Data

US 2015/0159734 A1 Jun. 11, 2015

(30) Foreign Application Priority Data

Dec. 6, 2013 (KR) ........................ 10-2013-0151329

(51) Int. Cl.
*F16H 1/28* (2006.01)
*B62D 5/00* (2006.01)
*F16H 1/32* (2006.01)

(52) U.S. Cl.
CPC .............. *F16H 1/2863* (2013.01); *B62D 5/008* (2013.01); *F16H 2001/324* (2013.01)

(58) Field of Classification Search
None
See application file for complete search history.

(56) References Cited

U.S. PATENT DOCUMENTS

| | | | | |
|---|---|---|---|---|
| 3,831,701 A | * | 8/1974 | Pilon | B62D 5/008 180/407 |
| 2006/0135312 A1 | * | 6/2006 | Shiina | B62D 5/008 475/339 |
| 2007/0179011 A1 | * | 8/2007 | Choi | B62D 5/008 475/331 |

* cited by examiner

*Primary Examiner* — Edwin A Young
(74) *Attorney, Agent, or Firm* — Hauptman Ham, LLP

(57) ABSTRACT

The present invention relates to a planetary gear apparatus. According to embodiments of the present invention, a distance between input and output planetary gears that are coupled to a connecting shaft provided with a resilient support member can be prevented from being reduced by more than a predetermined distance, thereby preventing loose feel caused by an axial movement of the planetary gears by a distance which the resilient support member is extended or compressed.

18 Claims, 14 Drawing Sheets

PLANETARY GEAR APPARATUS

CROSS-REFERENCE TO RELATED APPLICATION

This application claims priority from and the benefit under 35 U.S.C. §119(a) of Korean Patent Application No. 10-2013-0151329, filed on Dec. 6, 2013, which is hereby incorporated by reference for all purposes as if fully set forth herein.

BACKGROUND OF THE INVENTION

1. Field of the Invention

The present invention relates to a planetary gear apparatus. More particularly, the present invention relates to a planetary gear apparatus which can prevent a distance between input and output planetary gears coupled to a connecting shaft provided with a resilient support member from being reduced by more than a predetermined distance, thereby preventing loose feel caused by an axial movement of the planetary gears by a distance which the resilient support member is extended or compressed.

2. Description of the Prior Art

FIG. 1 illustrates a configuration of an active front wheel steering apparatus of a vehicle according to the related art. FIG. 2 is a sectional view schematically illustrating a gear ratio converting unit of an active front wheel steering apparatus of a vehicle according to the related art.

As illustrated in FIG. 1, the active front wheel steering apparatus according to the related art includes: a steering wheel 101; a steering shaft 103 connected to the steering wheel 101; a steering column 105 surrounding the steering shaft 103; an input angle sensor 107 provided at a lower end of the steering column 105; a gear ratio converting unit 109 provided below the input angle sensor 107; a first motor 111 for driving the gear ratio converting unit 109; a first motor position sensor 113 provided to the first motor 111; an output angle sensor 115 provided below the gear ratio converting unit 109; a vehicle speed sensor 117 for sensing a speed of a vehicle; a rack-pinion mechanism 121 provided below the gear ratio converting unit 109 and converting a rotary motion of the steering shaft 103 into a linear motion of a rack bar 119; a second motor 123 for supplying auxiliary steering power to the rack bar 119; and an Electronic Control Unit (ECU) 125 for receiving various types of signals from the input angle sensor 107, the first motor position sensor 113, and the output angle sensor 115 and controlling the first motor 111.

As illustrated in FIG. 2, the gear ratio converting unit according to the related art includes: an input shaft 210; a first sun gear 220 connected to a lower end of the input shaft 210; first planetary gears 270 externally meshed with the first sun gear 220; second planetary gears 280 connected with the first planetary gears 270 through planetary gear shafts 275; a second sun gear 230 externally meshed with the second planetary gears 280; an output shaft 240 connected with the second sun gear 230; a worm wheel 250; and a worm 260.

An operation principle of the active front wheel steering apparatus of the vehicle and the gear ratio converting unit according to the related art is as follows.

When a driver operates the steering wheel 101, the input shaft 210 rotates, and the first sun gear 220 provided at the lower end of the input shaft 220 rotates in conjunction with the input shaft 220.

In this case, the first planetary gears 270 externally meshed with the first sun gear 220 rotate, and the second planetary gears 280 connected with the first planetary gears 270 through the planetary gear shaft 275 rotate.

Finally, the second sun gear 230 externally meshed with the second planetary gears 280 rotates, and accordingly, the output shaft 240 extending from the second sun gear 230 rotates, so that the steering force caused by the driver's operation for the steering wheel 101 is transmitted to the rack-pinion mechanism 121.

However, in the above-described processes, the first motor 111 does not operate. When the first motor 111 operates, there is a change as follows.

When electrical signals are generated by the vehicle speed sensor 117 for sensing a speed of a vehicle, the input and output angle sensors 107 and 115 for sensing a change in steering angle, and the first motor position sensor 113, respectively, and transferred to the electronic control unit 125, the electronic control unit 125 transfers the electrical signals to the first motor 111 to drive the first motor 111.

Furthermore, as the first motor 111 is driven through the above-described processes, the worm 260 connected to a motor shaft (not illustrated) rotates, the worm wheel 250 meshed with the worm 260 rotates, and finally, a carrier 290 integrally formed with the worm wheel 250 rotates, thereby adjusting a ratio of an output angle to an input angle.

When a vehicle travels at high speed, even if the input shaft 210, the first sun gear 220, and the first planetary gears 270 are rotated through a driver's unidirectional operation for the steering wheel 101, the electronic control unit 125 controls the first motor 111 such that the carrier 290 as well as the worm wheel 250 rotates in a direction of obstructing rotation of the second planetary gears 280 connected with the first planetary gears 270. As a result, the active front wheel steering apparatus of the vehicle makes the rotation angle of the output shaft 240 smaller than that of the input shaft 210 to help the driver safely drive the vehicle.

Meanwhile, when the vehicle travels at low speed for parking, the electronic control unit 125 controls the first motor 111 to rotate in a direction in which the rotation angle of the output shaft 240 becomes larger than that of the input shaft 210. As a result, the active front wheel steering apparatus of the vehicle helps the driver operate the steering wheel at a smaller angle.

However, the gear ratio converting unit according to the related art has a problem in that precise steering control is difficult due to a backlash caused by abrasion of gear teeth, and, in particular, the steering apparatus of the vehicle has problems in that noise caused by the backlash incurs unpleasant feelings during steering, and the noise becomes larger as abrasion of the gear teeth is developed.

SUMMARY OF THE INVENTION

The present invention has been made in an effort to solve the above-described problems associated with prior art. As aspect of the present invention is to provide a planetary gear apparatus in which a resilient support member is provided between at least one pair of input and output planetary gears among pairs of input planetary gears meshed with an input sun gear and output planetary gears meshed with an output sun gear, to resiliently support the input and output planetary gears in an axially opposite directions, thereby compensating for a separation between the sun gears and the planetary gears.

Another aspect of the present invention is to provide a planetary gear apparatus that can prevent a distance between input and output planetary gears coupled to a connecting shaft provided with a resilient support member from being reduced by more than a predetermined distance, thereby preventing loose feel caused by an axial movement of the planetary gears by a distance which the resilient support member is extended or compressed.

The aspect of the present invention is not limited thereto, and other unmentioned aspects of the present invention may be clearly appreciated by those skilled in the art from the following descriptions.

In accordance with one aspect of the present invention, a planetary gear apparatus includes: a plurality of input planetary gears externally meshed with an input sun gear rotating in conjunction with an input shaft; a plurality of output planetary gears externally meshed with an output sun gear rotating in conjunction with an output shaft; connecting shafts connecting the input planetary gears and the output planetary gears facing each other; a resilient support member provided between at least one pair of the input and output planetary gears among pairs of the input and output planetary gears connected with each other through the connecting shafts, and resiliently supporting the input and output planetary gears in axially opposite directions; and a support member coupled to the connecting shaft to maintain a gap between the input and output planetary gears coupled to one of the connecting shafts other than the connecting shaft provided with the resilient support member, wherein a step part protruding in a radial direction is integrally formed with a middle outer peripheral surface of the connecting shaft provided with the resilient support member to prevent a gap between the input and output planetary gears from being reduced by more than a predetermined distance.

In accordance with another aspect of the present invention, a planetary gear apparatus includes: a plurality of input planetary gears externally meshed with an input sun gear rotating in conjunction with an input shaft; a plurality of output planetary gears externally meshed with an output sun gear rotating in conjunction with an output shaft; connecting shafts connecting the input planetary gears and the output planetary gears facing each other; a resilient support member provided between at least one pair of the input and output planetary gears among pairs of the input and output planetary gears connected with each other through the connecting shafts, and resiliently supporting the input and output planetary gears in axially opposite directions; and a support member coupled to the connecting shaft to maintain a gap between the input and output planetary gears coupled to one of the connecting shafts other than the connecting shaft provided with the resilient support member, wherein an axially extended support part is integrally formed with one of the input and output planetary gears coupled to the connection shaft provided with the resilient support member to prevent the gap between the input planetary gear and the output planetary gear from being reduced by more than a predetermined distance.

In accordance with another aspect of the present invention, a planetary gear apparatus includes: a plurality of input planetary gears externally meshed with an input sun gear rotating in conjunction with an input shaft; a plurality of output planetary gears externally meshed with an output sun gear rotating in conjunction with an output shaft; connecting shafts connecting the input planetary gears and the output planetary gears facing each other; a resilient support member provided between at least one pair of the input and output planetary gears among pairs of the input and output planetary gears connected with each other through the connecting shafts, and resiliently supporting the input and output planetary gears in axially opposite directions; and a support member coupled to the connecting shaft to maintain a gap between the input and output planetary gears coupled to one of the connecting shafts other than the connecting shaft provided with the resilient support member, wherein a gap adjusting member is coupled to the connection shaft provided with the resilient support member in order to prevent a gap between the input planetary gear and the output planetary gear from being reduced by more than a predetermined distance.

In accordance with another aspect of the present invention, a planetary gear apparatus includes: a plurality of input planetary gears externally meshed with an input sun gear rotating in conjunction with an input shaft; a plurality of output planetary gears externally meshed with an output sun gear rotating in conjunction with an output shaft; connecting shafts connecting the input planetary gears and the output planetary gears facing each other; a first resilient support member provided between at least one pair of the input and output planetary gears among pairs of the input and output planetary gears connected with each other through the connecting shafts, and resiliently supporting the input and output planetary gears in axially opposite directions; and a support member coupled to the connecting shaft to maintain a gap between the input and output planetary gears coupled to one of the connecting shafts other than the connecting shaft provided with the first resilient support member, wherein a second resilient support member is provided at the connection shaft provided with the first resilient support member to provide a resilient support force such that a gap between the input planetary gear and the output planetary gear is prevented from being reduced by more than a predetermined distance.

As described above, according to the embodiments of the present invention, the resilient support member is provided between at least one pair of the input and output planetary gears among pairs of the input planetary gears meshed with the input sun gear and the output planetary gears meshed with the output sun gear, to resiliently support the input and output planetary gears in the axially opposite directions, thereby compensating for the separation between the sun gears and the planetary gears.

Furthermore, the distance between the input and output planetary gears coupled to the connecting shaft provided with the resilient support member can be prevented from being reduced by more than the predetermined distance, thereby preventing loose feel caused by the axial movement of the planetary gears by the distance which the resilient support member is extended or compressed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, It should be appreciated that when one component is described as being "connected," "coupled" or "joined" to another component, a third component may be "connected," "coupled," and "joined" between the first and second components, although the first component may be directly connected, coupled or joined to the second component.

Figure 1:
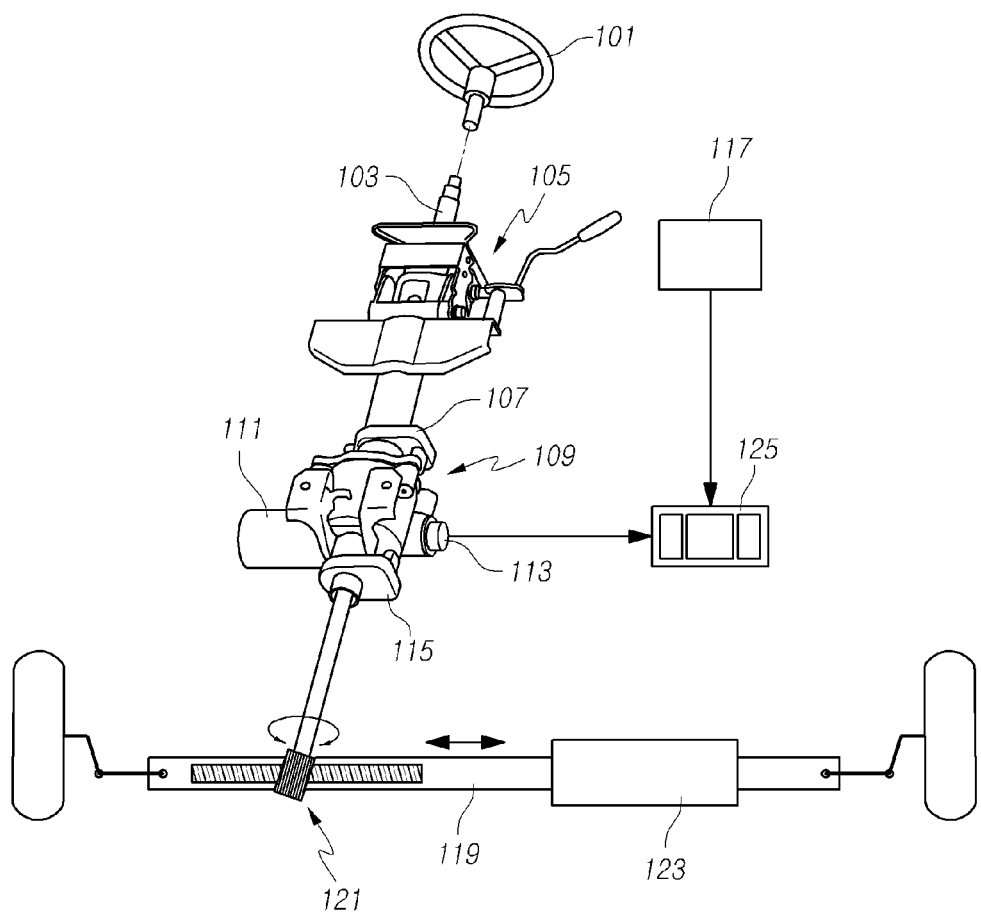
FIG. 1 illustrates a configuration of an active front wheel steering apparatus of a vehicle according to the related art.
Figure 2:
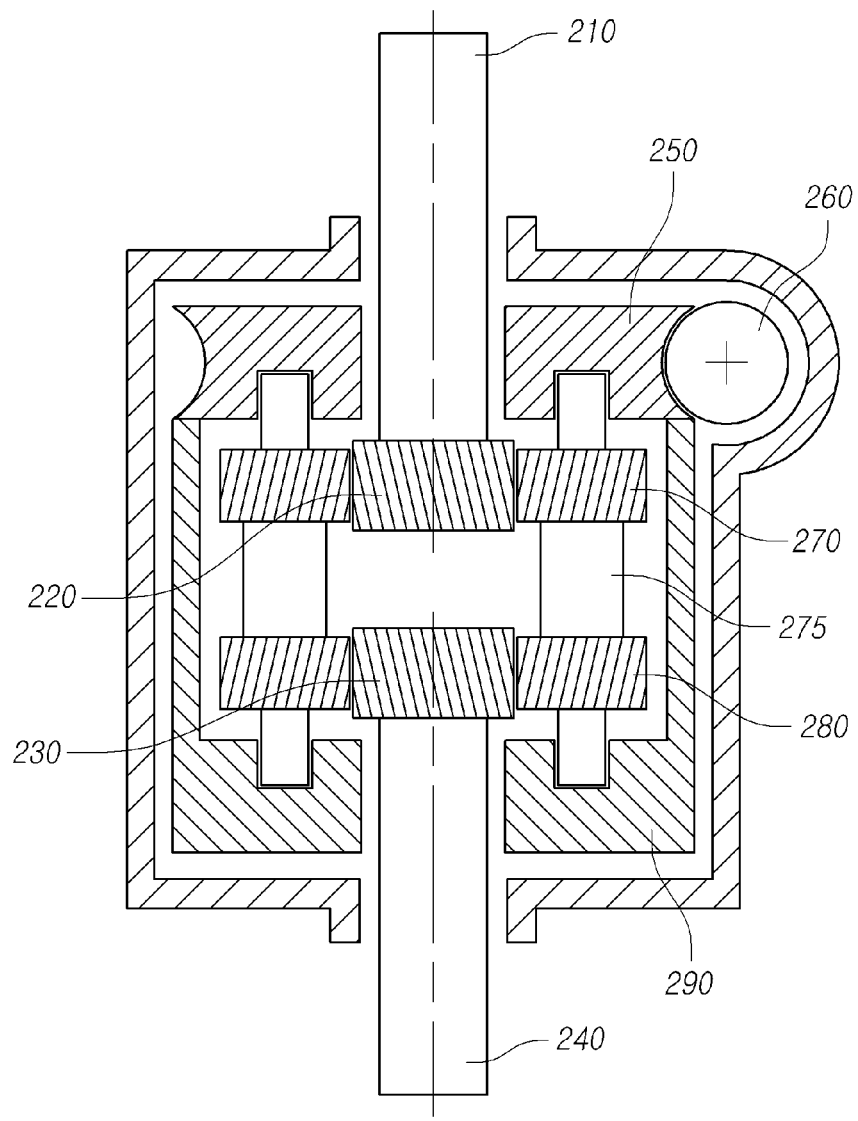
FIG. 2 is a sectional view schematically illustrating a gear ratio converting unit of an active front wheel steering apparatus of a vehicle according to the related art.
Figure 3:
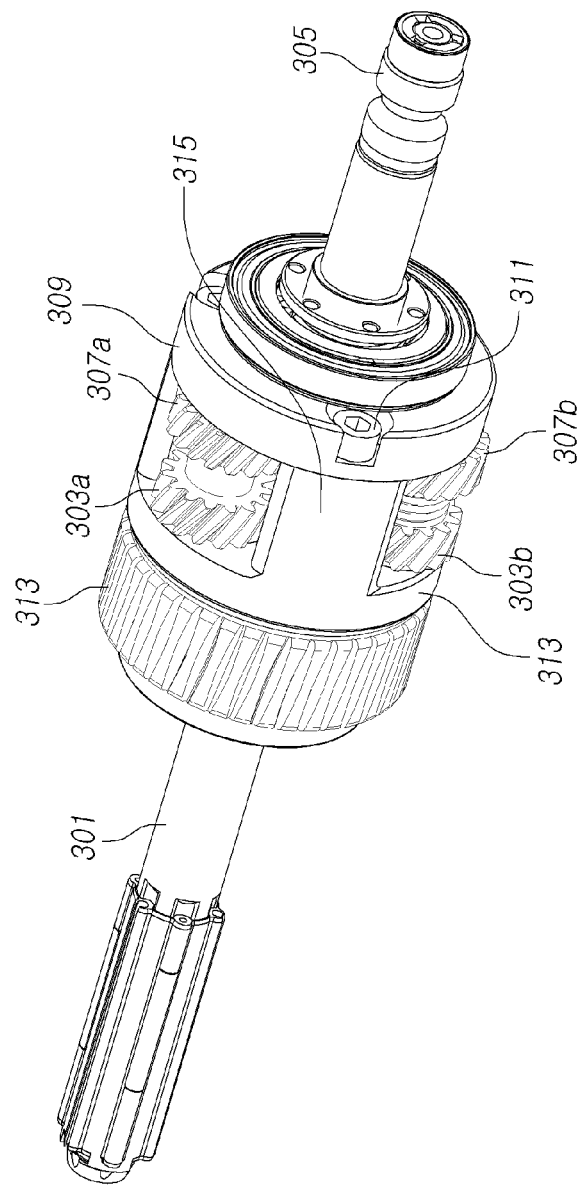
FIG. 3 is a perspective view illustrating some parts of an active front wheel steering apparatus provided with a planetary gear apparatus according to an embodiment of the present invention.
Figure 4:
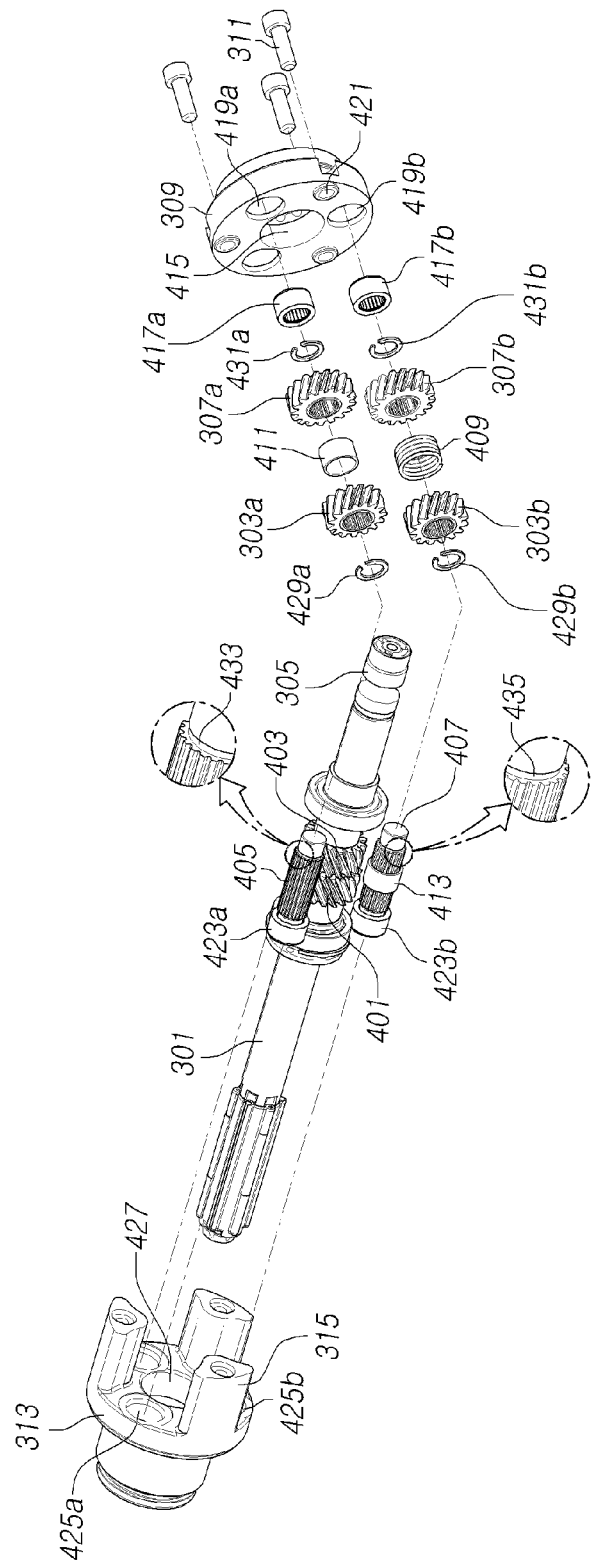
FIG. 4 is an exploded perspective view of FIG. 3.
Figure 5:
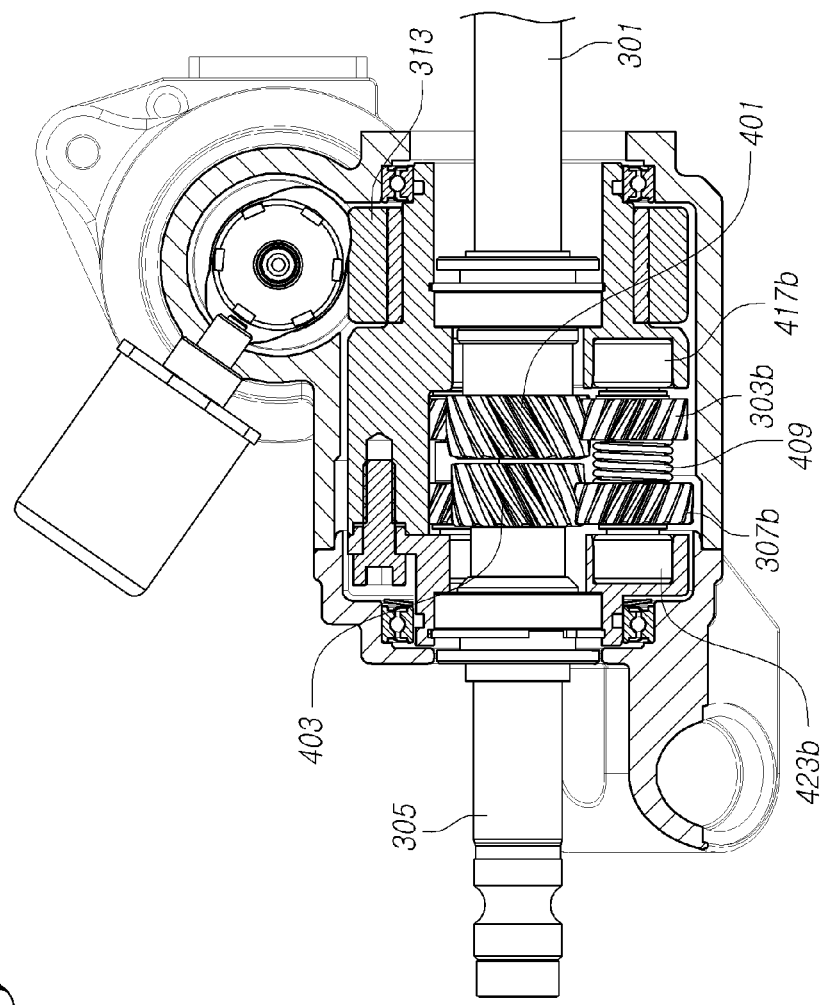
FIG. 5 is a sectional view illustrating some parts of the active front wheel steering apparatus provided with the planetary gear apparatus according to the embodiment of the present invention.
Figure 6:
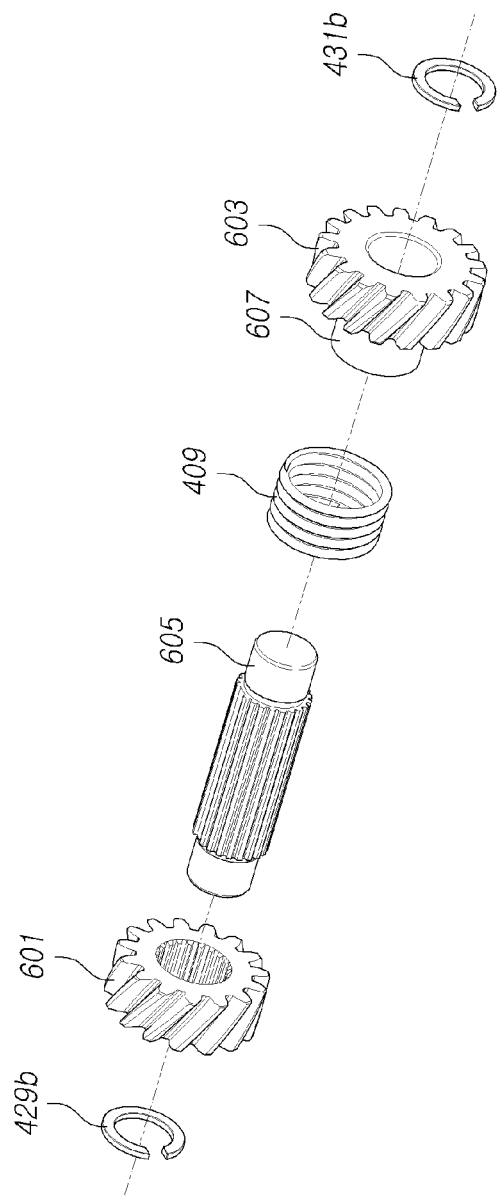
FIG. 6 is an exploded perspective view illustrating some parts of a planetary gear apparatus according to another embodiment of the present invention.
Figure 7:
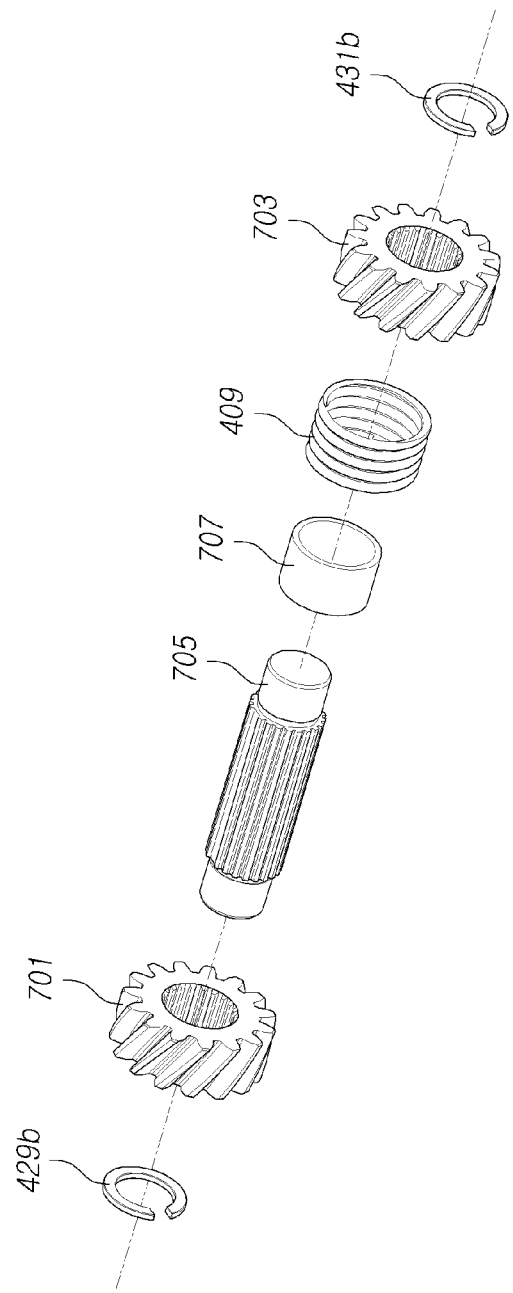
FIG. 7 is an exploded perspective view illustrating some parts of a planetary gear apparatus according to another embodiment of the present invention.
Figure 8:
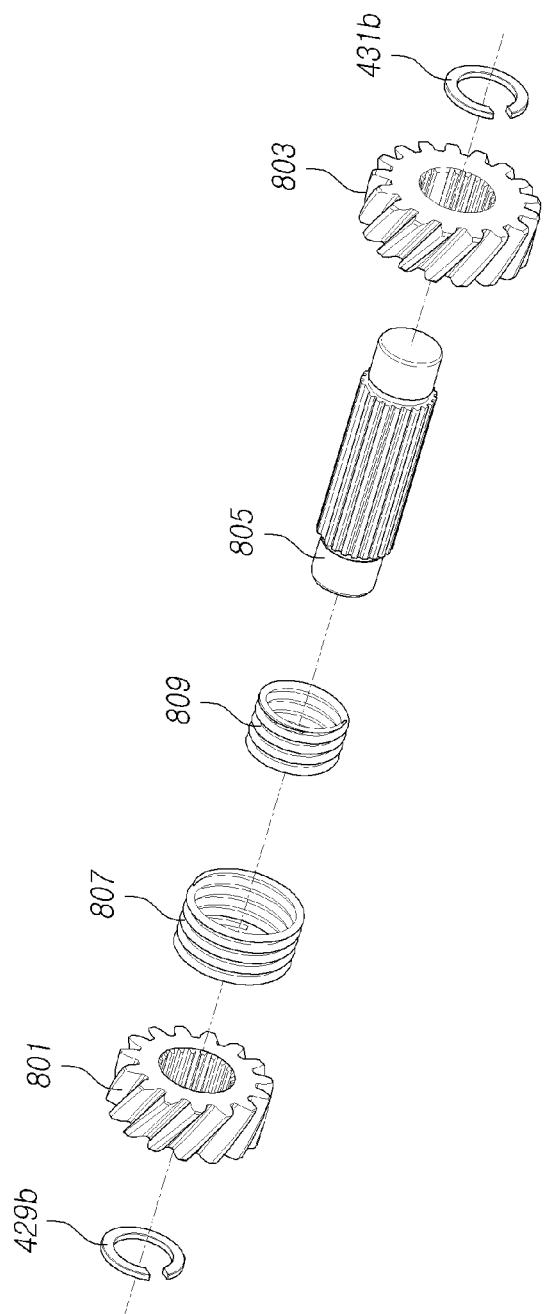
FIG. 8 is an exploded perspective view illustrating some parts of a planetary gear apparatus according to another embodiment of the present invention.
Figure 9:
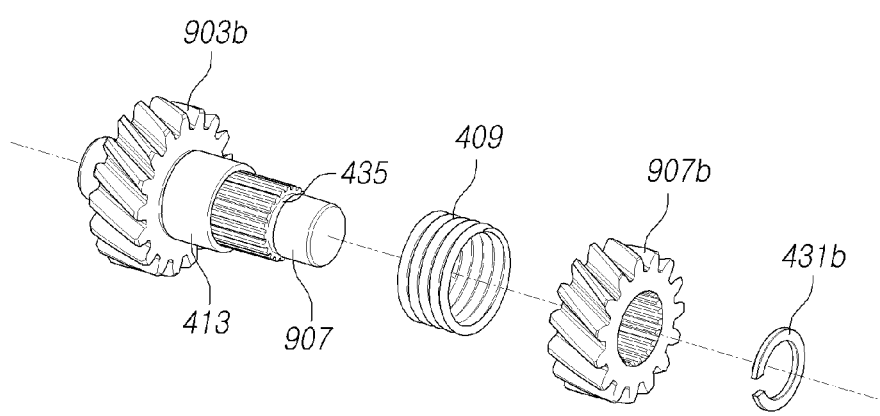
FIG. 9 is an exploded perspective view illustrating some parts of a planetary gear apparatus according to another embodiment of the present invention.
Figure 10:
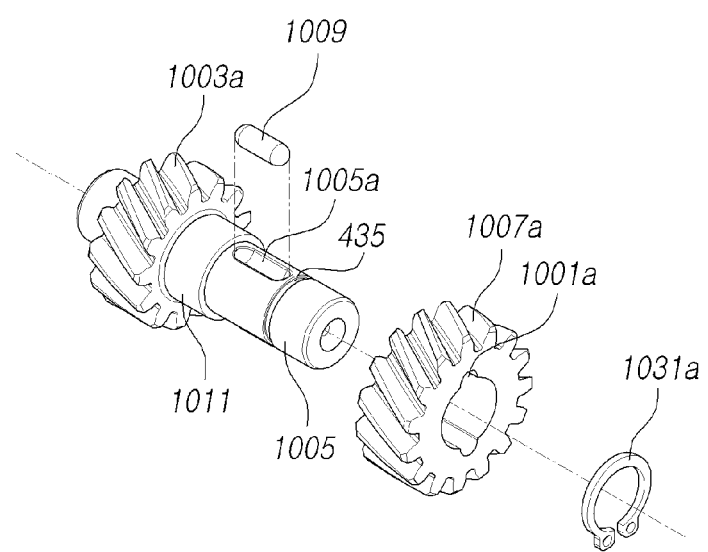
FIGS. 10 and 11 are exploded perspective views illustrating some parts of a planetary gear apparatus according to another embodiment of the present invention.
Figure 11:
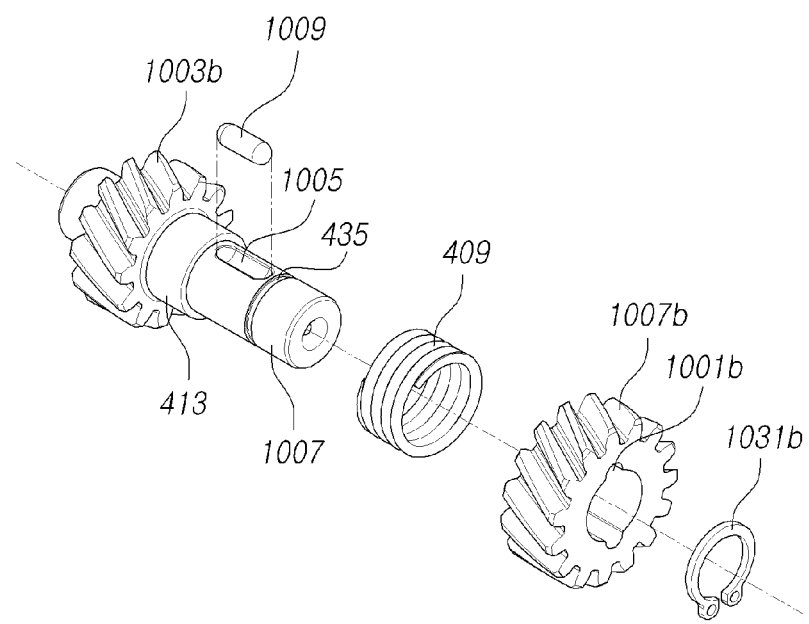
Figure 12:
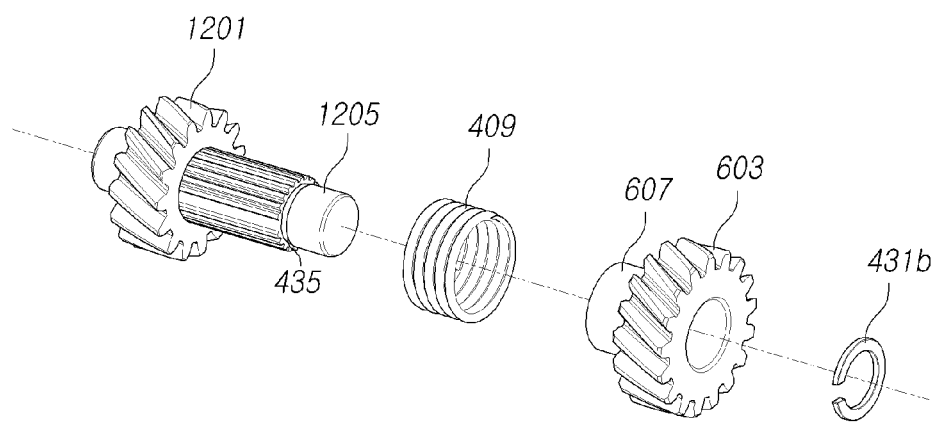
FIG. 12 is an exploded perspective view illustrating some parts of a planetary gear apparatus according to another embodiment of the present invention.
Figure 13:
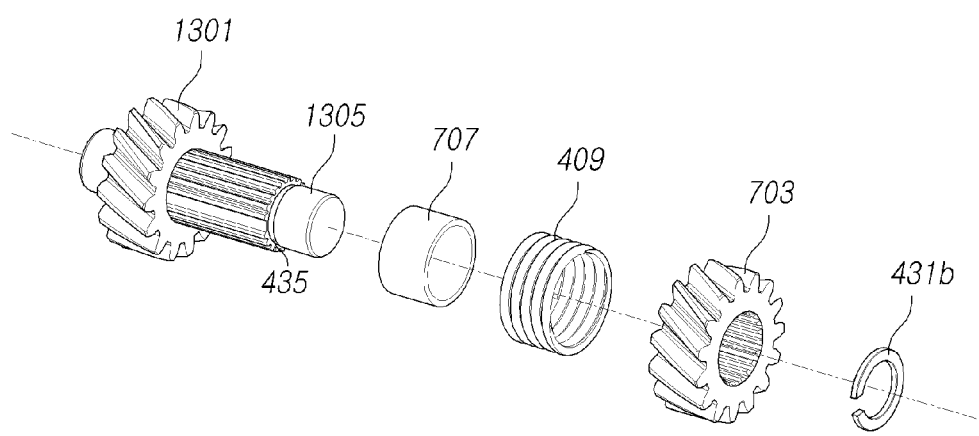
FIG. 13 is an exploded perspective view illustrating some parts of a planetary gear apparatus according to another embodiment of the present invention.
Figure 14:
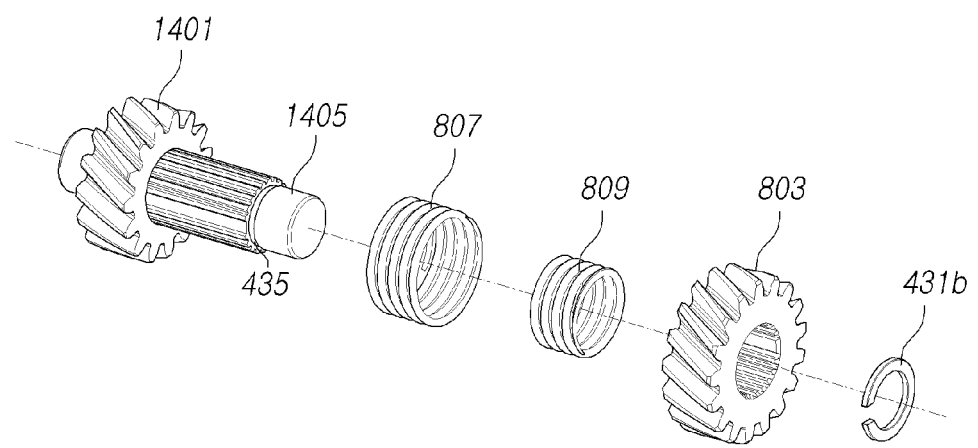
FIG. 14 is an exploded perspective view illustrating some parts of a planetary gear apparatus according to another embodiment of the present invention.

FIG. 3 is a perspective view illustrating some parts of an active front wheel steering apparatus provided with a planetary gear apparatus according to an embodiment of the present invention. FIG. 4 is an exploded perspective view of FIG. 3. FIG. 5 is a sectional view illustrating some parts of the active front wheel steering apparatus provided with the planetary gear apparatus according to the embodiment of the present invention. FIG. 6 is an exploded perspective view illustrating some parts of a planetary gear apparatus according to another embodiment of the present invention. FIG. 7 is an exploded perspective view illustrating some parts of a planetary gear apparatus according to another embodiment of the present invention. FIG. 8 is an exploded perspective view illustrating some parts of a planetary gear apparatus according to another embodiment of the present invention. FIG. 9 is an exploded perspective view illustrating some parts of a planetary gear apparatus according to another embodiment of the present invention. FIGS. 10 and 11 are exploded perspective views illustrating some parts of a planetary gear apparatus according to another embodiment of the present invention. FIG. 12 is an exploded perspective view illustrating some parts of a planetary gear apparatus according to another embodiment of the present invention. FIG. 13 is an exploded perspective view illustrating some parts of a planetary gear apparatus according to another embodiment of the present invention. FIG. 14 is an exploded perspective view illustrating some parts of a planetary gear apparatus according to another embodiment of the present invention.

As illustrated in the accompanying drawings, a planetary gear apparatus according to an embodiment of the present invention includes; a plurality of input planetary gears 303*a* and 303*b* externally meshed with an input sun gear 401 rotating in conjunction with an input shaft 301; a plurality of output planetary gears 307*a* and 307*b* externally meshed with an output sun gear 403 rotating in conjunction with an output shaft 305; connecting shafts 405 and 407 connecting the input planetary gears and the output planetary gears facing each other; a resilient support member 409 provided between at least one pair of the input and output planetary gears 303*b* and 307*b* among pairs of the input and output planetary gears connected with each other through the connecting shafts, and resiliently supporting the input and output planetary gears 303*b* and 307*b* in axially opposite directions; and a support member 411 coupled to the connecting shaft 405 to maintain a gap between the input and output planetary gears 303*a* and 307*a* coupled to the connecting shaft 405 other than the connecting shaft 407 provided with the resilient support member 409, in which a step part 413 protruding in a radial direction is integrally formed with a middle outer peripheral surface of the connecting shaft 407 provided with the resilient support member 409 to prevent a gap between the input and output planetary gears 303*b* and 307*b* from being reduced by more than a predetermined distance.

In the following description, it is illustrated that the input sun gear, the output sun gear, the input planetary gears, and the output planetary gears are formed of a helical gear.

The input sun gear 401 rotates in conjunction with the input shaft 301. The input shaft 301 is connected with a steering wheel (not illustrated) and rotates in conjunction with the steering wheel as a driver rotates the steering wheel (not illustrated).

The output sun gear 403 rotates in conjunction with the output shaft 305, and a carrier connecting member 309 is provided around the output shaft 305.

The carrier connecting member 309 has an annular shape. The carrier connecting member 309 is formed at the center thereof with a hole 415 through which the output shaft 305 passes, and bearing insertion holes 419*a* and 419*b* which bearings 417*a* and 417*b* coupled to one end of the connecting shafts 405 and 407 are inserted into and secured to are formed around the hole 415.

A fixing member fastening hole 421 is formed between the bearing insertion holes 419*a* and 419*b*, and a fixing member 311 passes through the fixing member fastening hole 421 to couples the carrier connecting member 309 to a carrier 313.

The input planetary gears 303*a* and 303*b* are externally meshed with the input sun gear 401 rotating in conjunction with the input shaft 301. A plurality of input planetary gears 303*a* and 303*b* may be provided, and in the embodiments of the present invention, an example is illustrated in which three input planetary gears are provided.

The output planetary gears 307*a* and 307*b* are externally meshed with the output sun gear 403. A plurality of output planetary gears 307*a* and 307*b* may also be provided, and in the embodiments of the present invention, an example is illustrated in which three output planetary gears are provided.

The connecting shafts 405 and 407 connect the input and output planetary gears facing each other. In the embodiments of the present invention, three input planetary gears and three output planetary gears are provided in pairs, and therefore three connecting shafts are provided.

Bearings 417*a* and 423*a* are coupled to opposite ends of the connecting shaft 405, and bearings 417*b* and 423*b* are coupled to opposite ends of the connecting shaft 407. The bearings 417*a* and 417*b* coupled to one end of the connecting shafts 405 and 407 are inserted into and coupled to the bearing insertion holes 419*a* and 419*b* formed in the carrier connecting member 309, and the bearings 423a and 423b coupled to the other end of the connecting shafts 405 and 407 are inserted into and coupled to bearing insertion holes 425a and 425b formed in the carrier 313.

The carrier 313 is formed at the center thereof with a hole 427 through which the input shaft 301 passes and on a side of an outer peripheral surface thereof with a worm wheel meshed with a worm (not illustrated).

The other end of the connecting shafts 405 and 407 is supported at and coupled to the inside of the carrier 313. As described above, the bearing insertion holes 425a and 425b are formed in the carrier 313, and the bearings 423a and 423b coupled to the other end of the connecting shafts 405 and 407 are inserted into and coupled to the bearing insertion holes 425a and 425b.

The bearing insertion holes 425a and 425b are formed around the hole 427 through which the input shaft 301 passes. A protruding bar 315 extending in an axial direction is formed between the bearing insertion holes 425a and 425b, and the fixing member 311 passing through the fixing member fastening hole 421 of the carrier connecting member 309 is coupled to the protruding bar 315.

The resilient support member 409 is provided between at least one pair of the input and output planetary gears 303b and 307b among the pairs of the input and output planetary gears connected with each other through the connecting shafts, and resiliently supports the input and output planetary gears 303b and 307b in the axially opposite directions.

The resilient support member 409 may be, for example, a coil spring, and may be provided to one or all of the connecting shafts other than the connecting shaft to which the support member 411 to be described below is coupled.

The support member 411 is coupled to one of the connecting shafts other than the connecting shaft 407 provided with the resilient support member 409, and maintains the gap between the input planetary gear 303a and the output planetary gear 307a.

That is, due to the support member 411, the input and output planetary gears 303a and 307a coupled to the connecting shaft 405 do not move in the axial direction, and a location of them are fixed. The support member 411 may be provided in a shape of a hollow cylinder.

The step part 413 protruding in the radial direction is integrally formed with the middle outer peripheral surface of the connecting shaft 407 provided with the resilient support member 409 to prevent the gap between the input and output planetary gears 303b and 307b from being reduced by more than the predetermined distance. The step part 413 has an axial width formed to an extent that the input and output planetary gears 303b and 307b coupled to the connecting shaft 407 may move in the axial direction by a predetermined distance.

As described above, the step part 413 formed integrally with the connecting shaft 407 provided with the resilient support member 409 restricts the axial movement of the input and output planetary gears 303b and 307b to the predetermined distance so that the resilient support member 409 is not extended or compressed by more than the predetermined distance, thereby making it possible to compensate for a separation without loose feel.

Here, "loose feel" implies that, when the resilient support member is extended or compressed in the process of compensating for the separation between the planetary gears and the sun gear, a feeling of the extension and compression of the resilient support member is delivered to a driver as it is.

Fixing members 429a and 431a are coupled to opposite ends of the connecting shaft 405 to support the input and output planetary gears 303a and 307a in the axial direction. The fixing members 429a and 431a are inserted into and secured to grooves 433 formed in a circumferential direction at the opposite ends of the connecting shaft 405. Fixing members 429b and 431b are coupled to opposite ends of the connecting shaft 407 to support the input and output planetary gears 303b and 307b in the axial direction. The fixing members 429b and 431b are inserted into and secured to grooves 435 formed in a circumferential direction at the opposite ends of the connecting shaft 407.

The input planetary gear 303a and the output planetary gear 307a are serration-coupled to the connecting shaft 405, and the input planetary gear 303b and the output planetary gear 307b are serration-coupled to the connecting shaft 407. Accordingly, a slip is prevented between the planetary gears and the connecting shafts.

Meanwhile, one of an input planetary gear 903b and an output planetary gear 907b coupled to a connecting shaft 907 may be integrally coupled to the connecting shaft 907. In FIG. 9, the input planetary gear 903b is integrally coupled to the connecting shaft 907. A fixing member 431b is coupled to the connecting shaft 907 to axially support the counterpart side planetary gear of the input planetary gear 903b or the output planetary gear 907b which is integrally coupled to the connecting shaft 907. A groove 435 is formed in the circumferential direction on the connecting shaft 907, and the fixing member 431b is inserted into and secured to the groove 435.

That is, the input planetary gear 903b is integrally coupled to the connecting shaft 907, and therefore the fixing member 429b axially supporting the aforementioned input planetary gear 303b is unnecessary.

Furthermore, a recessed key insertion way 1001a may be formed on an inner peripheral surface of a counterpart side planetary gear of an input planetary gear 1003a or an output planetary gear 1007a which is integrally coupled to the connecting shaft 1005, and the connecting shaft 1005 may be provided with a key member 1009 inserted into and coupled to the key insertion way 1001a. In FIGS. 10 and 11, the input planetary gear 1003a is integrally coupled to the connecting shaft 1005, and the key insertion way 1001a is formed on an inner peripheral surface of the output planetary gear 1007a.

On the inner peripheral surface of the output planetary gear 1007a, the key insertion way 1001a is formed with a recess structure in which axial opposite ends thereof are open. Accordingly, when the output planetary gear 1007a is fitted to the connecting shaft 1005 while the key insertion way 1001a of the output planetary gear 1007a is aligned with the key member 1009 in the axial direction, the output planetary gear 1007a and the connecting shaft 1005 are conveniently coupled to each other.

The key member 1009 may be inserted into and coupled to a coupling recess 1005a concavely formed on the connecting shaft 1005.

Meanwhile, the contents described above with reference to FIG. 10 represent another embodiment of the connecting shaft 405 to which the support member 411 is coupled and the input and output planetary gears 303a and 307a coupled to the connecting shaft 405, in which case a support member 1011 integrally formed with the connecting shaft 1005 performs the function of the support member 411 which is a separate component, and for example, a snap ring 1031a for a shaft corresponds to the fixing member 431a.

In addition, the contents described above with reference to FIG. 11 represent another embodiment of the connecting shaft 407 formed with the step part 413, and the input and output planetary gears 303b and 307b coupled to the connecting shaft 407, in which case, for example, a snap ring 1031*b* for a shaft corresponds to the fixing member 431*b*.

A planetary gear apparatus according to another embodiment of the present invention includes; a plurality of input planetary gears 303*a* and 601 externally meshed with an input sun gear 401 rotating in conjunction with an input shaft 301; a plurality of output planetary gears 307*a* and 603 externally meshed with an output sun gear 403 rotating in conjunction with an output shaft 305; connecting shafts 405 and 605 connecting the input planetary gears and the output planetary gears facing each other; a resilient support member 409 provided between at least one pair of the input and output planetary gears 601 and 603 among pairs of the input and output planetary gears connected with each other through the connecting shafts, and resiliently supporting the input and output planetary gears 601 and 603 in axially opposite directions; and a support member 411 coupled to the connecting shaft 405 to maintain a gap between the input and output planetary gears 303*a* and 307*a* coupled to the connecting shaft 405 other than the connecting shaft 605 provided with the resilient support member 409, in which an axially extended support part 607 is integrally formed with one of the input and output planetary gears 601 and 603 coupled to the connection shaft 605 provided with the resilient support member 409 to prevent a gap between the input planetary gear 601 and the output planetary gear 603 from being reduced by more than a predetermined distance.

Here, elements other than the connecting shaft 605 provided with the resilient support member 409 and the input and output planetary gears 601 and 603 coupled to the connecting shaft 605 are identical to those of the above-described planetary gear apparatus according to the embodiment of the present invention, and therefore detailed descriptions thereof will be omitted.

Unlike the above-described connecting shaft 407, the connecting shaft 605 is formed with a structure in which the step part 413 is not formed, and is formed with the same structure as that of the connecting shaft 405 provided with the support member 411.

Meanwhile, the axially extended support part 607 is integrally formed with one of the input and output planetary gears 601 and 603, and similarly to the aforementioned step part 413, prevents the gap between the input planetary gear 601 and the output planetary gear 603 from being reduced by more than the predetermined distance.

Furthermore, one of an input planetary gear 1201 and an output planetary gear 603 coupled to a connecting shaft 1205 may be integrally coupled to the connecting shaft 1205. In FIG. 12, the input planetary gear 1201 is integrally coupled to the connecting shaft 1205 provided with a resilient support member 409. A fixing member 431*b* is coupled to the connecting shaft 1205 to axially support the counterpart side planetary gear of the input planetary gear 1201 or the output planetary gear 603 which is integrally coupled to the connecting shaft 1205. A groove 435 is formed in the circumferential direction on the connecting shaft 1205, and the fixing member 431*b* is inserted into and secured to the groove 435.

That is, the input planetary gear 1201 is integrally coupled to the connecting shaft 1205, and therefore the fixing member 429*b* axially supporting the input planetary gear 1201 is unnecessary.

Of course, the embodiment in which the input planetary gear 1201 is integrally coupled to the connecting shaft 1205 may also be employed for the input planetary gear 303*a* coupled to the connecting shaft 405 to which the support member 411 is coupled.

A planetary gear apparatus according to another embodiment of the present invention includes; a plurality of input planetary gears 303*a* and 701 externally meshed with an input sun gear 401 rotating in conjunction with an input shaft 301; a plurality of output planetary gears 307*a* and 703 externally meshed with an output sun gear 403 rotating in conjunction with an output shaft 305; connecting shafts 405 and 705 connecting the input planetary gears and the output planetary gears facing each other; a resilient support member 409 provided between at least one pair of the input and output planetary gears 701 and 703 among pairs of the input and output planetary gears connected with each other through the connecting shafts, and resiliently supporting the input and output planetary gears 701 and 703 in axially opposite directions; and a support member 411 coupled to the connecting shaft 405 to maintain a gap between the input and output planetary gears 303*a* and 307*a* coupled to the connecting shaft 405 other than the connecting shaft 705 provided with the resilient support member 409, in which a gap adjusting member 707 is coupled to the connection shaft 705 provided with the resilient support member 409 to prevent a gap between the input planetary gear 701 and the output planetary gear 703 from being reduced by more than a predetermined distance.

Here, elements other than the connecting shaft 705 provided with the resilient support member 409 and the gap adjusting member 707 coupled to the connecting shaft 705 are identical to those of the above-described planetary gear apparatus according to the embodiment of the present invention, and therefore detailed descriptions thereof will be omitted.

Unlike the above-described connecting shaft 407, the connecting shaft 705 is formed with a structure in which the step part 413 is not formed, and is formed with the same structure as that of the connecting shaft 405 provided with the support member 411.

Meanwhile, the gap adjusting member 707 is coupled to the connection shaft 705 provided with the resilient support member 409 to prevent the gap between the input planetary gear 701 and the output planetary gear 703 from being reduced by more than the predetermined distance. The gap adjusting member 707 may have, for example, a hollow cylinder shape, and identically to the aforementioned step part 413, prevents the gap between the input planetary gear 701 and the output planetary gear 703 from being reduced by more than the predetermined distance.

Furthermore, one of an input planetary gear 1301 and an output planetary gear 703 coupled to a connecting shaft 1305 may be integrally coupled to the connecting shaft 1305. In FIG. 13, the input planetary gear 1301 is integrally coupled to the connecting shaft 1305 provided with a resilient support member 409. A fixing member 431*b* is coupled to the connecting shaft 1305 to axially support the counterpart side planetary gear of the input planetary gear 1301 of the output planetary gear 703 which is integrally coupled to the connecting shaft 1305. A groove 435 is formed in the circumferential direction on the connecting shaft 1305, and the fixing member 431*b* is inserted into and secured to the groove 435.

That is, the input planetary gear 1301 is integrally coupled to the connecting shaft 1305, and therefore the fixing member 429*b* axially supporting the input planetary gear 1301 is unnecessary.

Of course, the embodiment in which the input planetary gear 1301 is integrally coupled to the connecting shaft 1305 may also be employed for the input planetary gear 303*a* coupled to the connecting shaft 405 to which the support member 411 is coupled.

A planetary gear apparatus according to another embodiment of the present invention includes; a plurality of input planetary gears 303a and 801 externally meshed with an input sun gear 401 rotating in conjunction with an input shaft 301; a plurality of output planetary gears 307a and 803 externally meshed with an output sun gear 403 rotating in conjunction with an output shaft 305; connecting shafts 405 and 805 connecting the input planetary gears and the output planetary gears facing each other; a first resilient support member 807 provided between at least one pair of the input and output planetary gears 801 and 803 among pairs of the input and output planetary gears connected with each other through the connecting shafts, and resiliently supporting the input and output planetary gears 801 and 803 in axially opposite directions; and a support member 411 coupled to the connecting shaft 405 to maintain a gap between the input and output planetary gears 303a and 307a coupled to the connecting shaft 405 other than the connecting shaft 805 provided with the first resilient support member 807, in which a second resilient support member 809 is provided at the connection shaft 805 provided with the first resilient support member 807 to provide a resilient support force so as to prevent a gap between the input planetary gear 801 and the output planetary gear 803 from being reduced by more than a predetermined distance.

Here, elements other than the connecting shaft 805 provided with the first resilient support member 870 and the second resilient member 809 coupled to the connecting shaft 805 are identical to those of the above-described planetary gear apparatus according to the embodiment of the present invention, and therefore detailed descriptions thereof will be omitted.

Unlike the above-described connecting shaft 407, the connecting shaft 805 is formed with a structure in which the step part 413 is not formed, and is formed with the same structure as that of the connecting shaft 405 provided with the support member 411.

Likewise to the aforementioned resilient support member 409, the first resilient support member 807 resiliently supports the input and output planetary gears 801 and 803 in axially opposite directions.

Meanwhile, the second resilient support member 809 provides a resilient support force to the input and output planetary gears 801 and 803 to prevent the gap between the input and output planetary gears 801 and 803 from being reduced by more than the predetermined distance. The second resilient support member 809 is formed to have a smaller diameter than that of the first resilient support member 807, and therefore may be disposed within the first resilient support member 807.

In contrast, the first resilient support member 807 may be formed to have a smaller diameter than that of the second resilient support member 809, and therefore may also be disposed around the second resilient support member 809.

Since the first resilient member 807 resiliently supports the input and output planetary gears 801 and 803 in the axially opposite directions, and the second resilient support member 809 provides the resilient support force to prevent the gap between the input and output planetary gears 801 and 803 from being reduced by more than the predetermined distance, the second resilient support member 809 may be formed to have an axial distance smaller than that of the first resilient support member 807.

In addition, one of an input planetary gear 1401 and an output planetary gear 803 coupled to a connecting shaft 1405 may be integrally coupled to the connecting shaft 1405. In FIG. 14, the input planetary gear 1401 is integrally coupled to the connecting shaft 1405 provided with resilient support member 807 and 809. A fixing member 431b is coupled to the connecting shaft 1405 to axially support the counterpart side planetary gear of the input planetary gear 1401 or the output planetary gear 803 which is integrally coupled to the connecting shaft 1405. A groove 435 is formed in the circumferential direction on the connecting shaft 1405, and the fixing member 431b is inserted into and secured to the groove 435.

That is, the input planetary gear 1401 is integrally coupled to the connecting shaft 1405, and therefore the fixing member 429b axially supporting the input planetary gear 1401 is unnecessary.

Of course, the embodiment in which the input planetary gear 1401 is integrally coupled to the connecting shaft 1405 may also be employed for the input planetary gear 303a coupled to the connecting shaft 405 to which the support member 411 is coupled.

Meanwhile, in the above-described embodiments, the input and output planetary gears may be formed of a plastic material, and the input and output sun gears may be formed of a metallic material. As described above, the input and output planetary gears are formed of the plastic material so that an impulse between the sun gears and the planetary gears can be alleviated.

Of course, in contrast to the above description, the input and output sun gears may also be formed of a plastic material, and the input and output planetary gears may also be formed of a metallic material. Furthermore, only some of the sun gears and the planetary gears may also be formed of the plastic material, and combinations thereof may be employed in various ways.

As described above, according to the embodiments of the present invention, the resilient support member is provided between at least one pair of the input and output planetary gears among pairs of the input planetary gears meshed with the input sun gear and the output planetary gears meshed with the output sun gear, to resiliently support the input and output planetary gears in the axially opposite directions, thereby compensating for the separation between the sun gears and the planetary gears.

Furthermore, the distance between the input and output planetary gears coupled to the connecting shaft provided with the resilient support member can be prevented from being reduced by more than the predetermined distance, thereby preventing loose feel caused by the axial movement of the planetary gears by the distance which the resilient support member is extended or compressed.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

| Description of reference numerals | |
|---|---|
| 301: INPUT SHAFT | 303a, 303b: INPUT PLANETARY GEAR |
| 305: OUTPUT SHAFT | 307a, 307b: OUTUT PLANETARY GEAR |
| 309: CARRIER CONNECTING MEMBER | 401: IPUT SUN GEAR |
| 403: OUTPUT SUN GEAR | 405, 407: CONNECING SHAFT |
| 409: RESILIENT SUPPORT MEMBER | 411: SUPPORT MEMBER |
| 413: STEP PART | 607: EXTENDED SUPPORT PART |
| 707: GAP ADJUSTING MEMBER | |

What is claimed is:

1. A planetary gear apparatus comprising:
    a plurality of input planetary gears externally meshed with an input sun gear rotating in conjunction with an input shaft;
    a plurality of output planetary gears externally meshed with an output sun gear rotating in conjunction with an output shaft;
    connecting shafts connecting the input planetary gears and the output planetary gears facing each other;
    a resilient support member provided between at least one pair of the input and output planetary gears among pairs of the input and output planetary gears connected with each other through the connecting shafts, and resiliently supporting the input and output planetary gears in axially opposite directions; and
    a support member coupled to the connecting shaft to maintain a gap between the input and output planetary gears coupled to one of the connecting shafts other than the connecting shaft provided with the resilient support member,
    wherein a step part protruding in a radial direction is integrally formed with a middle outer peripheral surface of the connecting shaft provided with the resilient support member to prevent a gap between the input and output planetary gears from being reduced by more than a predetermined distance, or
    wherein an axially extended support part is integrally formed with one of the input and output planetary gears coupled to the connection shaft provided with the resilient support member to prevent the gap between the input planetary gear and the output planetary gear from being reduced by more than a predetermined distance.

2. The planetary gear apparatus of claim 1, wherein fixing members are coupled to opposite ends of the connecting shafts to axially support the input and output planetary gears.

3. The planetary gear apparatus of claim 1, wherein the input and output planetary gears are serration-coupled to the connecting shafts.

4. The planetary gear apparatus of claim 1, wherein one of the input planetary gear and the output planetary gear coupled to the corresponding connecting shaft is integrally coupled to the connecting shaft.

5. The planetary gear apparatus of claim 4, wherein a fixing member is coupled to the connecting shaft to axially support the counterpart side planetary gear of the input planetary gear or the output planetary gear which is integrally coupled to the connecting shaft.

6. The planetary gear apparatus of claim 4, wherein a recessed key insertion way is formed on an inner peripheral surface of the counterpart side planetary gear of the input planetary gear or the output planetary gear which is integrally coupled to the connecting shaft, and the connecting shaft is provided with a key member inserted into and coupled to the key insertion way.

7. The planetary gear apparatus of claim 6, wherein the key member is inserted into and coupled to a fixing recess formed to be recessed on the connecting shaft.

8. A planetary gear apparatus comprising:
    a plurality of input planetary gears externally meshed with an input sun gear rotating in conjunction with an input shaft;
    a plurality of output planetary gears externally meshed with an output sun gear rotating in conjunction with an output shaft;
    connecting shafts connecting the input planetary gears and the output planetary gears facing each other;
    a resilient support member provided between at least one pair of the input and output planetary gears among pairs of the input and output planetary gears connected with each other through the connecting shafts, and resiliently supporting the input and output planetary gears in axially opposite directions; and
    a support member coupled to the connecting shaft to maintain a gap between the input and output planetary gears coupled to one of the connecting shafts other than the connecting shaft provided with the resilient support member,
    wherein a gap adjusting member is coupled to the connection shaft provided with the resilient support member to prevent a gap between the input planetary gear and the output planetary gear from being reduced by more than a predetermined distance.

9. The planetary gear apparatus of claim 8, wherein fixing members are coupled to opposite ends of the connecting shafts to axially support the input and output planetary gears.

10. The planetary gear apparatus of claim 8, wherein the input and output planetary gears are serration-coupled to the connecting shafts.

11. The planetary gear apparatus of claim 8, wherein one of the input planetary gear and the output planetary gear coupled to the corresponding connecting shaft is integrally coupled to the connecting shaft.

12. The planetary gear apparatus of claim 11, wherein a fixing member is coupled to the connecting shaft to axially support the counterpart side planetary gear of the input planetary gear or the output planetary gear which is integrally coupled to the connecting shaft.

13. A planetary gear apparatus comprising:
    a plurality of input planetary gears externally meshed with an input sun gear rotating in conjunction with an input shaft;
    a plurality of output planetary gears externally meshed with an output sun gear rotating in conjunction with an output shaft;
    connecting shafts connecting the input planetary gears and the output planetary gears facing each other;
    a first resilient support member provided between at least one pair of the input and output planetary gears among pairs of the input and output planetary gears connected with each other through the connecting shafts, and resiliently supporting the input and output planetary gears in axially opposite directions; and
    a support member coupled to the connecting shaft to maintain a gap between the input and output planetary gears coupled to one of the connecting shafts other than the connecting shaft provided with the first resilient support member,
    wherein a second resilient support member is provided at the connection shaft provided with the first resilient support member to provide a resilient support force such that a gap between the input planetary gear and the output planetary gear is prevented from being reduced by more than a predetermined distance.

14. The planetary gear apparatus of claim 13, wherein one of the first and second resilient support members is formed to have a larger diameter than that of the other.

15. The planetary gear apparatus of claim 13, wherein fixing members are coupled to opposite ends of the connecting shafts to axially support the input and output planetary gears.

16. The planetary gear apparatus of claim 13, wherein the input and output planetary gears are serration-coupled to the connecting shafts.

17. The planetary gear apparatus of claim 13, wherein one of the input planetary gear and the output planetary gear coupled to the corresponding connecting shaft is integrally coupled to the connecting shaft.

18. The planetary gear apparatus of claim 17, wherein a fixing member is coupled to the connecting shaft to axially support the counterpart side planetary gear of the input planetary gear or the output planetary gear which is integrally coupled to the connecting shaft.

* * * * *